(12) United States Patent
Fujiune et al.

(10) Patent No.: US 8,547,811 B2
(45) Date of Patent: Oct. 1, 2013

(54) LASER POWER CONTROL METHOD AND LASER POWER CONTROL APPARATUS

(75) Inventors: Kenji Fujiune, Osaka (JP); Takeharu Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/322,923

(22) PCT Filed: May 31, 2011

(86) PCT No.: PCT/JP2011/003024
§ 371 (c)(1),
(2), (4) Date: Nov. 29, 2011

(87) PCT Pub. No.: WO2011/152029
PCT Pub. Date: Dec. 8, 2011

(65) Prior Publication Data
US 2012/0170436 A1    Jul. 5, 2012

(30) Foreign Application Priority Data
Jun. 1, 2010   (JP) .................................. 2010-125575

(51) Int. Cl.
*G11B 7/00*    (2006.01)
(52) U.S. Cl.
USPC ....................................... 369/47.53; 369/116
(58) Field of Classification Search
USPC .............. 369/47.1, 47.5, 47.51, 47.52, 47.53, 369/53.27, 116, 120, 47.27, 122, 121
See application file for complete search history.

(56) References Cited

U.S. PATENT DOCUMENTS

| | | | |
|---|---|---|---|
| 6,320,832 B1 | 11/2001 | Nakao et al. | |
| 6,639,890 B1 | 10/2003 | Miura et al. | |
| 7,310,293 B2 * | 12/2007 | Senga et al. | ............... 369/47.53 |
| 7,978,574 B2 * | 7/2011 | Narumi | ....................... 369/47.53 |
| 8,121,004 B2 * | 2/2012 | Fushimi et al. | ............ 369/47.53 |
| 2002/0021641 A1 * | 2/2002 | Miyabata et al. | .......... 369/53.26 |
| 2004/0233826 A1 * | 11/2004 | Sugano | ......................... 369/116 |
| 2004/0257940 A1 | 12/2004 | Senga et al. | |
| 2005/0185546 A1 * | 8/2005 | Watabe | ....................... 369/47.51 |
| 2007/0071046 A1 * | 3/2007 | Quek et al. | ................. 372/38.02 |
| 2009/0059978 A1 | 3/2009 | Nagashima | |

FOREIGN PATENT DOCUMENTS

| | | |
|---|---|---|
| JP | 2000-020955 | 1/2000 |
| JP | 2000-215453 | 8/2000 |
| JP | 2003-059044 | 2/2003 |
| JP | 2004-273036 | 9/2004 |
| JP | 2004-310901 | 11/2004 |

(Continued)

OTHER PUBLICATIONS

International Search Report issued Aug. 2, 2011 in International (PCT) Application No. PCT/JP2011/003024.

*Primary Examiner* — Nabil Hindi
(74) *Attorney, Agent, or Firm* — Wenderoth, Lind & Ponack, L.L.P.

(57) ABSTRACT

With a large capacity of an optical disk and high-speed recording, a frequency of a recording signal is increased and a pulse width is narrowed. In the case that a laser is driven by a signal having the short pulse width, unfortunately the high-speed recording is hardly performed to an optical disk when a rise time and a fall time of the optical pulse are lengthened. During user data recording, a bottom driving current is set to a second bottom driving current value that is a current value of a threshold or less, so that the rise time and the fall time of the optical pulse can be shortened to perform the high-speed recording of the optical disk.

12 Claims, 19 Drawing Sheets

(56) References Cited

FOREIGN PATENT DOCUMENTS

| | | |
|---|---|---|
| JP | 2004-319073 | 11/2004 |
| JP | 2005-317097 | 11/2005 |
| JP | 2007-172694 | 7/2007 |
| JP | 2009-059448 | 3/2009 |

\* cited by examiner

FIG. 16
(a) Laser emission intensity
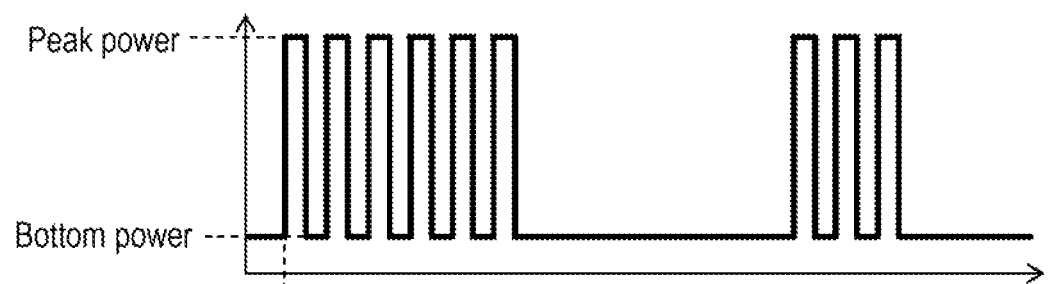
(b) Recording track

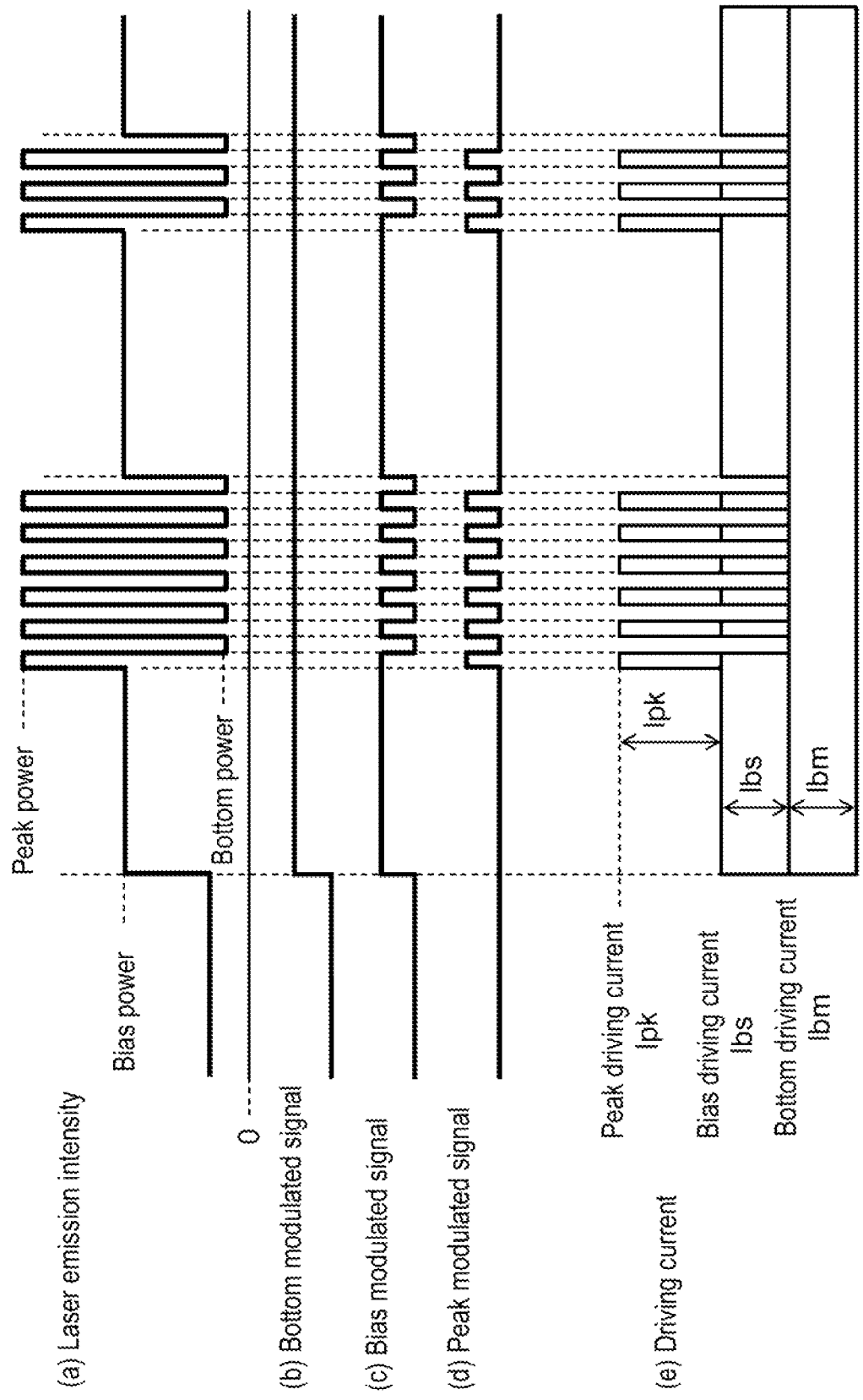

LASER POWER CONTROL METHOD AND LASER POWER CONTROL APPARATUS

TECHNICAL FIELD

The present invention relates to a laser power control method and a laser power control apparatus. Particularly, the present invention relates to a laser power control method and a laser power control apparatus, which can perform high-speed recording with a laser beam in an optical disk apparatus that records a signal on an optical disk.

BACKGROUND ART

Recently, with a large capacity of an optical disk, a demand for the optical disk is increasing in the fields of an auxiliary storage device of a computer, a consumer video recorder, and the like. With increasing the storage capacity, there is a demand for high-speed recording and high-speed reproduction.

When a recording mark is formed on the optical disk, emission intensity (hereinafter, referred to as a laser power or a power) of a semiconductor laser is set to a plurality of levels and modulated by a recording signal. The plurality of levels depend on a kind of a recording medium of the optical disk. FIG. 16 illustrates a relationship between the laser power and the recording mark with respect to a write-once optical disk by way of example. FIG. 17 illustrates a relationship between the laser power and the recording mark with respect to a rewritable optical disk.

During the recording, the example of the write-once optical disk of FIG. 16 has two kinds of levels of the emission intensity, namely, a bottom power and a peak power. The recording mark is recorded on a recording track in a multi-pulse emission interval in which an optical output is modulated between the peak power and the bottom power. The multi-pulse emission is adopted in order to more correctly form the recording mark. However, the multi-pulse emission can be eliminated depending on the recording medium or a recording condition of the optical disk. In the case of the write-once optical disk, the signal is neither written in nor deleted from the recording medium during the interval in which the emission is not performed at the peak power.

During the recording, the example of the rewritable optical disk of FIG. 17 has three kinds of levels of the emission intensity, namely, the bottom power, a bias power, and the peak power. The recording mark is recorded on the recording track in the multi-pulse emission interval in which the optical output is modulated between the peak power and the bottom power. The multi-pulse emission is adopted in order to more correctly form the recording mark. A recording space is recorded on the recording track in the interval of the constant bias power.

An example of a laser power control apparatus used in the rewritable optical disk of FIG. 18 will be described below.

FIG. 18 is a block diagram of a conventional laser power control apparatus. Semiconductor laser 200 is driven by laser driver 210. Laser driver 210 includes peak current source 201, bias current source 202, bottom current source 203, and modulators 204, 205, and 206 corresponding to the current sources. Peak current source 201, bias current source 202, bottom current source 203 are controlled by a control signal. Calculator 220 calculates the control signal based on a signal referring to the optical output of semiconductor laser 200. Peak current source 201, bias current source 202, bottom current source 203 supply a peak driving current Ipk, a bias driving current Ibs, and a bottom driving current Ibm to set the peak power, the bias power, and the bottom power, respectively.

Modulators 204, 205, and 206 are controlled to turn on and off the peak driving current Ipk, the bias driving current Ibs, and the bottom driving current Ibm according to the recording pulse generated by recording pulse generator 230. The turned-on and turned-off driving currents are supplied to semiconductor laser 200 after added.

FIG. 19 illustrates a relationship between the driving current of the conventional laser power control apparatus and an optical waveform.

FIG. 19(a) illustrates the optical waveform of the laser during the recording. During the recording, as illustrated in FIGS. 19(b), 19(c), and 19(d), a bottom modulated signal, a bias modulated signal, and a peak modulated signal are modulated to switch the driving currents to the laser according to a recording signal.

As illustrated in FIG. 19(e), the bottom driving current Ibm supplied by bottom current source 203, the bias driving current Ibs supplied by bias current source 202, and the peak driving current Ipk supplied by peak current source 201 are modulated by the bottom modulated signal, the bias modulated signal, and the peak modulated signal and added to become a final laser driving current.

In the above configuration, the recording mark is formed in the multi-pulse emission interval in which the peak modulated signal and the bias modulated signal are switched, and the recording space is formed when the laser power is kept constant while the peak modulated signal and the bias modulated signal are not switched. Specifically, in the multi-pulse emission interval in which the recording mark is formed, the driving current in which the peak driving current Ipk and the bias driving current Ibs are added with the bottom driving current Ibm being used as the base driving current is switched by the peak modulated signal and the bias modulated signal (for example, refer to Patent Literature 1).

A frequency of the recording signal is increased with the large capacity of the optical disk and the high-speed recording. Due to the multi-pulse emission, the frequency of the optical pulse is further increased, and a pulse width becomes as short as several nanoseconds or less. In the conventional laser power control apparatus, when the signal having the short pulse width is driven, the waveform of the optical pulse is deformed from a rectangular shape to a trapezoidal shape or a triangular shape by influences of a rise time Tr and a fall time Tf of the optical pulse. The rise time Tr and the fall time Tf of the optical pulse influence temperature control when the recording medium of the optical disk is rapidly melted and cooled. When the rise time Tr and the fall time Tf are lengthened, as a result, unfortunately the proper temperature control is hardly performed at the recording medium of the optical disk, and the high-speed recording is hardly performed.

CITATION LIST

Patent Literature

PTL 1: Unexamined Japanese Patent Publication No. 2005-317097

SUMMARY OF THE INVENTION

An object of the present invention is to provide a laser power control method in which the rise time and the fall time of the optical pulse width forming the recording mark are shortened even if the frequency of the recording signal is increased to narrow the optical pulse width with the high-speed recording.

In accordance with the present invention, a laser power control method in which a laser power is modulated between a bottom power and a peak power to record a signal on an optical disk, includes the steps or setting a bottom driving current corresponding to the bottom power to a first bottom driving current value that is not lower than a threshold current during test recording; and setting the bottom driving current corresponding to the bottom power from the first bottom driving current value to a second bottom driving current value that is a current value of a threshold or less during user data recording.

Moreover, in accordance with the present invention, a laser power control apparatus that controls a laser power used to record a signal on an optical disk, includes: a calculator that sets the laser power to a bottom power and a peak power by controlling a driving current used to drive a laser; a modulator that performs pulse emission of the laser power between the bottom power and the peak power by a recording signal; and a controller that sets a bottom driving current corresponding to the bottom power to a first bottom driving current value that is not lower than a threshold current during test recording and sets the bottom driving current corresponding to the bottom power to a second bottom driving current value that is a current value of a threshold or less during user data recording.

According to the laser power control method of the present invention, during the user data recording, the bottom driving current is set to the second bottom driving current value that is a current value of a threshold or less, so that the rise time and the fall time of the optical pulse can be shortened to perform the high-speed recording of the optical disk.

BRIEF DESCRIPTION OF DRAWINGS

FIG. 16 is a diagram illustrating a relationship between the laser power and a recording mark with respect to a write-once optical disk.

FIG. 19 is a diagram illustrating a relationship between the driving current of the conventional laser power control apparatus and the optical waveform.

DESCRIPTION OF EMBODIMENTS

Figure 1:
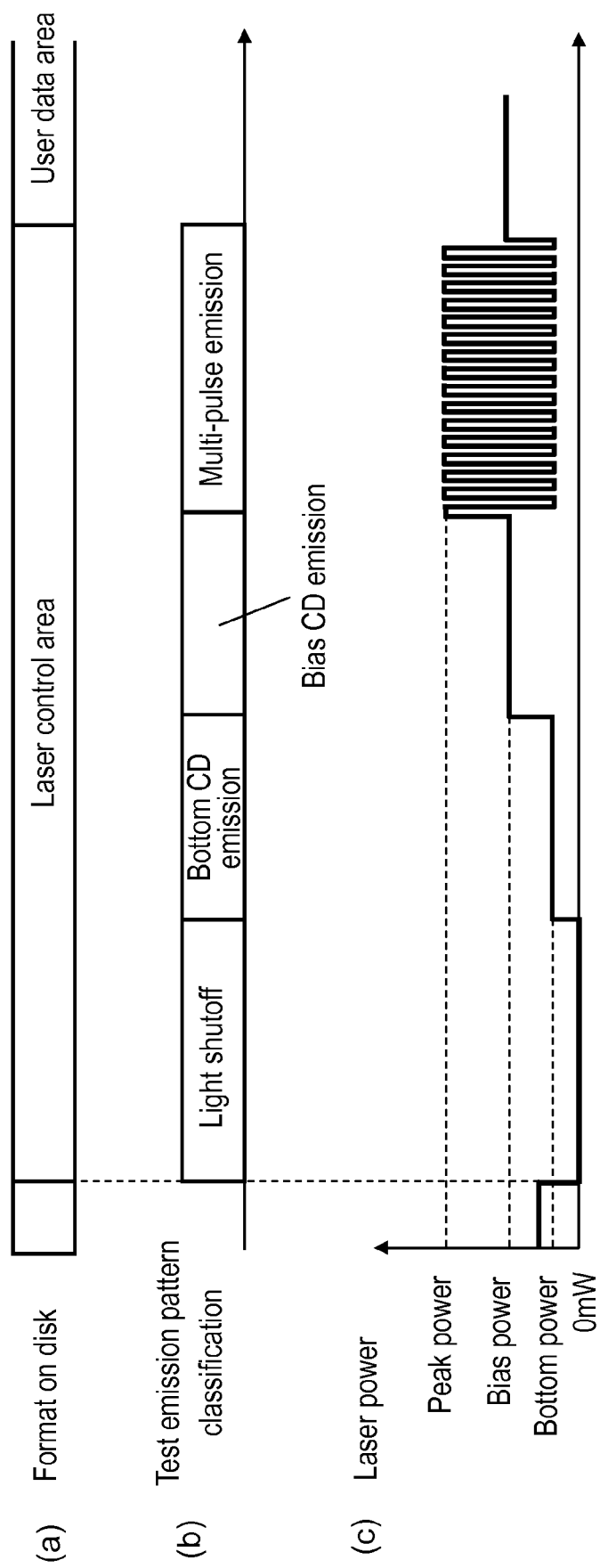
FIG. 1 is a diagram illustrating an example of a relationship between a test area on an optical disk and a laser power.

Hereinafter, preferred exemplary embodiments of the present invention will be described with reference to the drawings. In the drawings, the substantially same component is designated by the same numeral.

First Exemplary Embodiment

FIG. 1 is a diagram illustrating an example of a relationship between a test area on an optical disk, which is used in a laser power control method and a laser power control apparatus of the present invention, and a laser power.

FIG. 1(a) illustrates a laser control area on the optical disk, to which test recording of the laser power is performed and a user data area except the laser control area.

Test emission of a semiconductor laser is performed in the laser control area that is provided at predetermined intervals on the optical disk, whereby the relationship between the laser power and a driving current is measured to calibrate the laser power. Using the calibrated laser power, the user data is recorded on the optical disk in the user data area subsequent to the laser control area.

FIG. 1(b) illustrates an example of a test emission pattern in the laser control area. FIG. 1(c) illustrates an example of an emission waveform of the laser. Three kinds of the laser powers, namely, a bottom power, a bias power, and a peak power are tested. FIG. 1 illustrates the example of the test pattern in the laser control area of the rewritable optical disk. On the other hand, in a write-once optical disk, the test emission can be performed only by the bottom power and the peak power while the bias power is eliminated.

Figure 2:
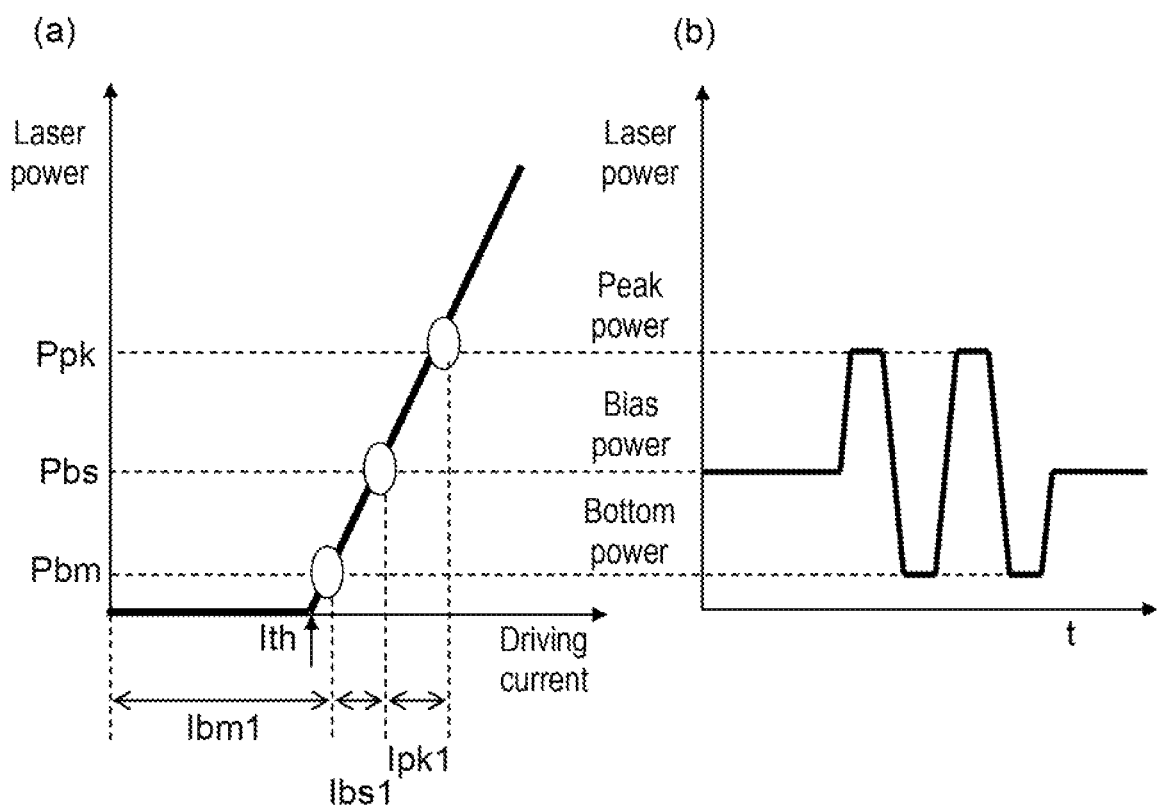
FIG. 2 is a diagram illustrating a relationship between a laser driving current and the laser power during test recording in a first exemplary embodiment of the present invention.

FIG. 2 is a diagram illustrating a relationship between the laser driving current and the laser power during test recording in a first exemplary embodiment of the present invention.

FIG. 2(a) illustrates a relationship between the laser driving current and the laser power. FIG. 2(b) illustrates an optical waveform that is optically modulated between a peak power and a bottom power during the recording.

In FIG. 2(a), a horizontal axis indicates the driving current and a vertical axis indicates the laser power. In the relationship between the driving current and the laser power, the laser has two areas, namely, a natural emission area and a laser emission area. The driving current ranges from 0 mA to threshold Ith in the natural emission area, and the driving current becomes the threshold Ith or more in the laser emission area.

In the laser emission area, there is a linear relationship between the driving current and the laser power, and a gradient of the linear relationship is referred to as slope efficiency.

During the test recording, the driving currents and the laser powers are sampled using some emission patterns illustrated in FIG. 1(c). The laser power, in which the laser is driven to perform DC emission by a bottom driving current Ibm1, is monitored and set to a bottom power Pbm. The laser power, in which the laser is driven to perform emission by addition of a bias driving current Ibs1 to the bottom driving current Ibm1, is monitored and set to a bias power Pbs. In the interval in which the multi-pulse emission is performed by the recording signal, the bottom driving current Ibm1 is driven as a base while not modulated, and a driving current Ibs1+Ipk1 in which the bias driving current Ibs1 and the peak driving current Ipk1 are added is modulated to obtain optical modulation between the peak power Ppk and the bottom power Pbm as illustrated in FIG. 2(b).

The relationship between the laser driving current and the bottom power, the bias power, and the peak power is measured by the test recording, and the bottom power, the bias power, and the peak power are arbitrarily calibrated and set during the user data recording based on the pieces of measured data.

In the first exemplary embodiment, the bottom driving current Ibm1 corresponding to the bottom power Pbm during the test recording is larger than the threshold current Ith, and referred to as a first bottom driving current value Ibm1.

Because the first bottom driving current value Ibm1 is larger than the threshold current Ith, as illustrated in FIG. 2(b), the corresponding bottom power Pbm is the laser emission area and becomes the laser power of at least 0 mW or more.

A laser power control method in recording the actual user data after the test recording will be described below.

Figure 3:
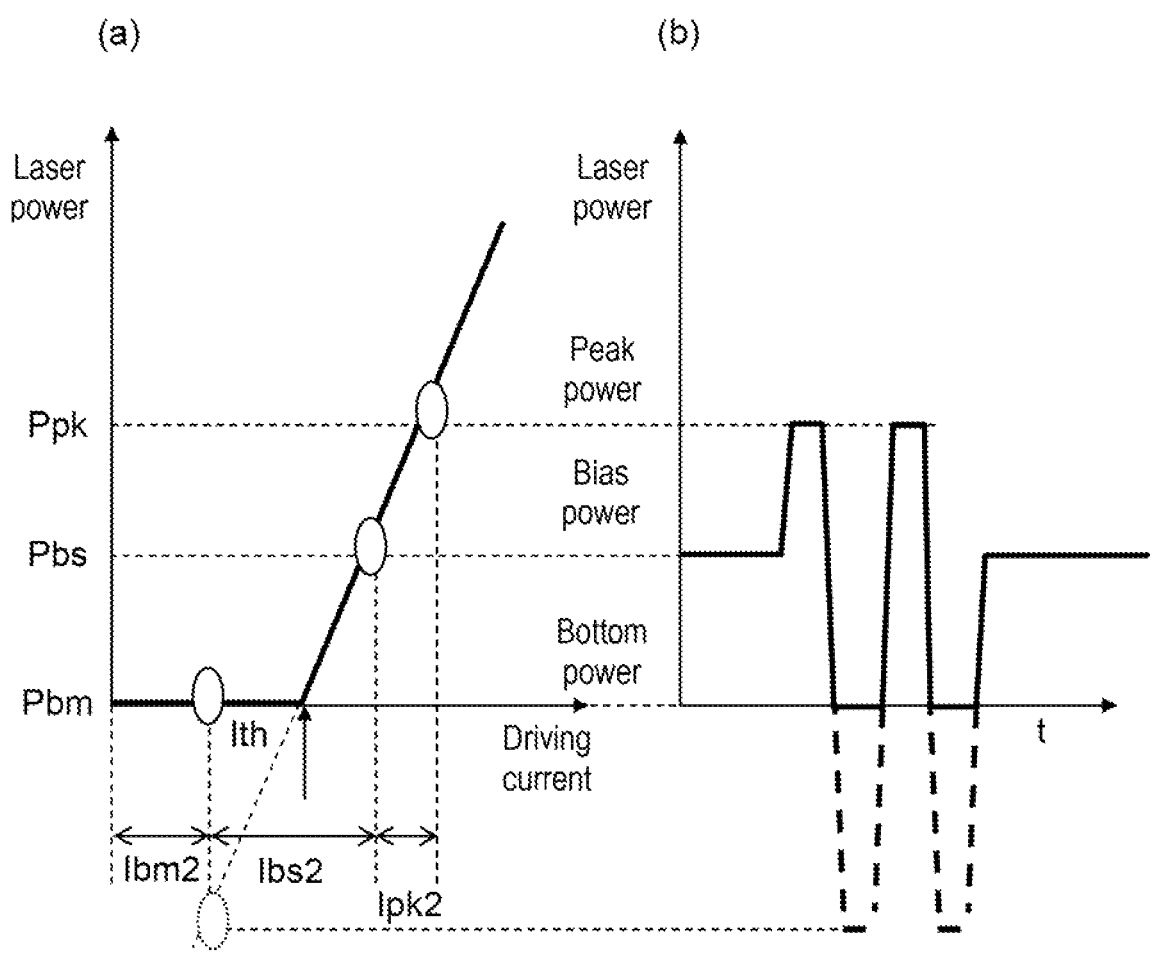
FIG. 3 is a diagram illustrating a relationship between the laser driving current and the laser power during user data recording in the first exemplary embodiment of the present invention.

FIG. 3 is a diagram illustrating a relationship between the laser driving current and the laser power during user data recording in the first exemplary embodiment of the present invention.

FIG. 3(a) illustrates the relationship between the laser driving current and the laser power. FIG. 3(b) illustrates the optical waveform that is optically modulated between the peak power and the bottom power during the user data recording.

In FIG. 3(a), a horizontal axis indicates the driving current and a vertical axis indicates the laser power. For the sake of easy understanding, it is assumed that a peak power Ppk and a bias power Pbs of FIG. 3(a) are equal to the peak power Ppk and the bias power Pbs of FIG. 2(a) during the test recording.

At first, the bottom driving current Ibm during the user data recording differs from the bottom driving current Ibm during the test recording. During the test recording, the first bottom driving current value Ibm1 is set as the current larger than the threshold current Ith. In FIG. 3(a), during the user data recording, a second bottom driving current value Ibm2 is set as a current smaller than the threshold current Ith. Therefore, the second bottom driving current value Ibm2 is smaller than the first bottom driving current value Ibm1.

As can be seen from the optical waveform of FIG. 3(b), the bottom power Pbm becomes approximately 0 mW because the second bottom driving current value Ibm2 is set smaller than the threshold current Ith. The bottom power Pbm is virtually illustrated in a negative area in FIG. 3(b) for the sake of easy understanding of an effect of the second bottom driving current value Ibm2.

Then the bias driving current Ibs during the user data recording differs from the bias driving current Ibs during the test recording. Because the second bottom driving current value Ibm2 is set smaller than the first bottom driving current value Ibm1, in order to equalize the bias power Pbm of FIG. 2(a) and the bias power Pbm of FIG. 3(a), a bias driving current value Ibs2 added to the second bottom driving current value Ibm2 is set larger than a bias driving current value Ibs1 during the test recording.

Since a decrease of the bottom driving current Ibm is corrected by an increase of the bias driving current Ibs, a peak driving current value Ipk2 may be substantially equal to a peak driving current value Ipk1 during the test recording.

Using the thus set driving currents, the optical modulation of the multi-pulse emission is obtained by the recording signal between the peak power Ppk and the bottom power Pbm of FIG. 3(b). In the multi-pulse emission interval, two kinds of the driving currents, namely, i) the driving current in which the second bottom driving current Ibm2, the bias driving current Ibs2, and the peak driving current Ipk2 are added and ii) the second bottom driving current Ibm2 are switched. In other words, the second bottom driving current Ibm2 is passed as the base DC driving current while not modulated, and a driving current Ibs2+Ipk2 in which the bias driving current Ibs2 and the peak driving current Ipk2 are added is modulated.

During the foregoing test recording, the first bottom driving current Ibm1 is used as the base, and the driving current Ibs1+Ipk1 in which the bias driving current Ibs1 and the peak driving current Ipk1 are added is modulated. As described above, the peak driving current Ipk1 and the peak driving current Ipk2 are equal to each other. On the other hand, the bias driving current Ibs1 during the test recording is smaller than the bias driving current Ibs2 during the user data recording. This is because the sum of the first bottom driving current Ibm1 and the bias driving current Ibs1 during test recording is equal to the sum of the second bottom driving current Ibm2 and the bias driving current Ibs2 during the user data recording. Because the first bottom driving current value Ibm1 is greater than the second bottom driving current value Ibm2, the bias driving current Ibs1 is less than the bias driving current Ibs2.

Therefore, when the multi-pulse emission is performed by the recording signal during the user data recording, the modulated driving current Ibs2+Ipk2 is larger than the driving current Ibs1+Ipk1 during the test recording.

Therefore, during the user data recording in which the second bottom driving current value Ibm2 is set smaller than the threshold current Ith to increase the modulated driving current, the rise time Tr and the fall time Tf of the pulse waveform of the optical modulation are shortened compared with those of the test recording.

A background of the effect that improves the laser optical output, the rise time Tr, and the fall time Tf will be described with reference to FIG. 4.

Figure 4:
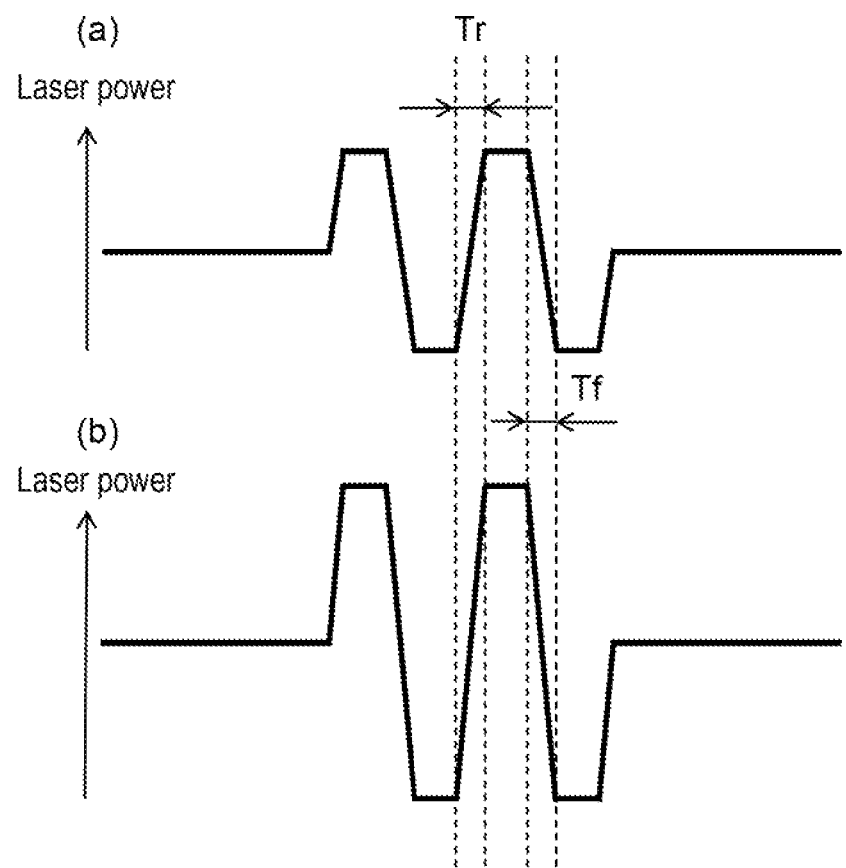
FIG. 4 is a diagram illustrating a relationship between a laser optical output and a rise time Tr and a fall time Tf in the first exemplary embodiment of the present invention.

FIG. 4 is a diagram illustrating a relationship between the laser optical output and the rise time Tr and the fall time Tf in the first exemplary embodiment of the present invention. FIG. 4(a) illustrates an optical waveform that is optically modulated in the case of a small difference between the peak power Ppk and the bottom power Pbm. FIG. 4(b) illustrates an optical waveform that is optically modulated when a difference between the peak power Ppk and the bottom power Pbm is larger than the difference between the peak power Ppk and the bottom power Pbm of FIG. 4(a). Basically the magnitude of a difference between the peak power Ppk and the bottom power Pbm is linearly correlated with that of the driving current.

As can be seen from the comparison of FIGS. 4(a) and 4(b), characteristics of the laser optical output and the rise time Tr and the fall time Tf in the small difference between the peak power Ppk and the bottom power Pbm of FIG. 4(a) are approximately identical to those in the large difference between the peak power Ppk and the bottom power Pbm of FIG. 4(b).

The waveforms of the optical modulation of FIGS. 2(b) and 3(b) described above will be described based on the characteristics of FIG. 4.

It is assumed that the peak power Ppk during the test recording is equal to the peak power Ppk during the user data recording. The bottom power Pbm is kept at about 0 mW because the bottom power Pbm is around the threshold current Ith. However, the actual bottom driving current Ibm is set to the first bottom driving current value Ibm1 during the test recording of FIG. 2(b), and set to the second bottom driving current value Ibm2 that is smaller than the first bottom driving current value Ibm1 during the user data recording of FIG. 3(b). Therefore, the second bottom driving current Ibm2 is used as the base driving current, and the driving current Ibs2+Ipk2 that is larger than that during the test recording is modulated during the user data recording. At this point, the bottom power of approximately 0 mW or more is used as the actual optical output. Because the broken-line portion of the optical output modulation, which is virtually indicated in FIG. 3(b) is not used, the rise time Tr and the fall time Tf of the optical pulse are improved.

In the case that the waveform of the optical modulation of FIG. 3(b) is applied to the optical disk for Blu-ray recording, although a measurement effect depends on the recording condition, as an example of experimental data, the rise time Tr of about 1 ns and the fall time Tf of about 1 ns are obtained in the laser power control apparatus of the first exemplary embodiment compared with the conventional laser power control apparatus having the rise time Ti of about 2 ns and the fall time Tf of about 2 ns.

Figure 5:
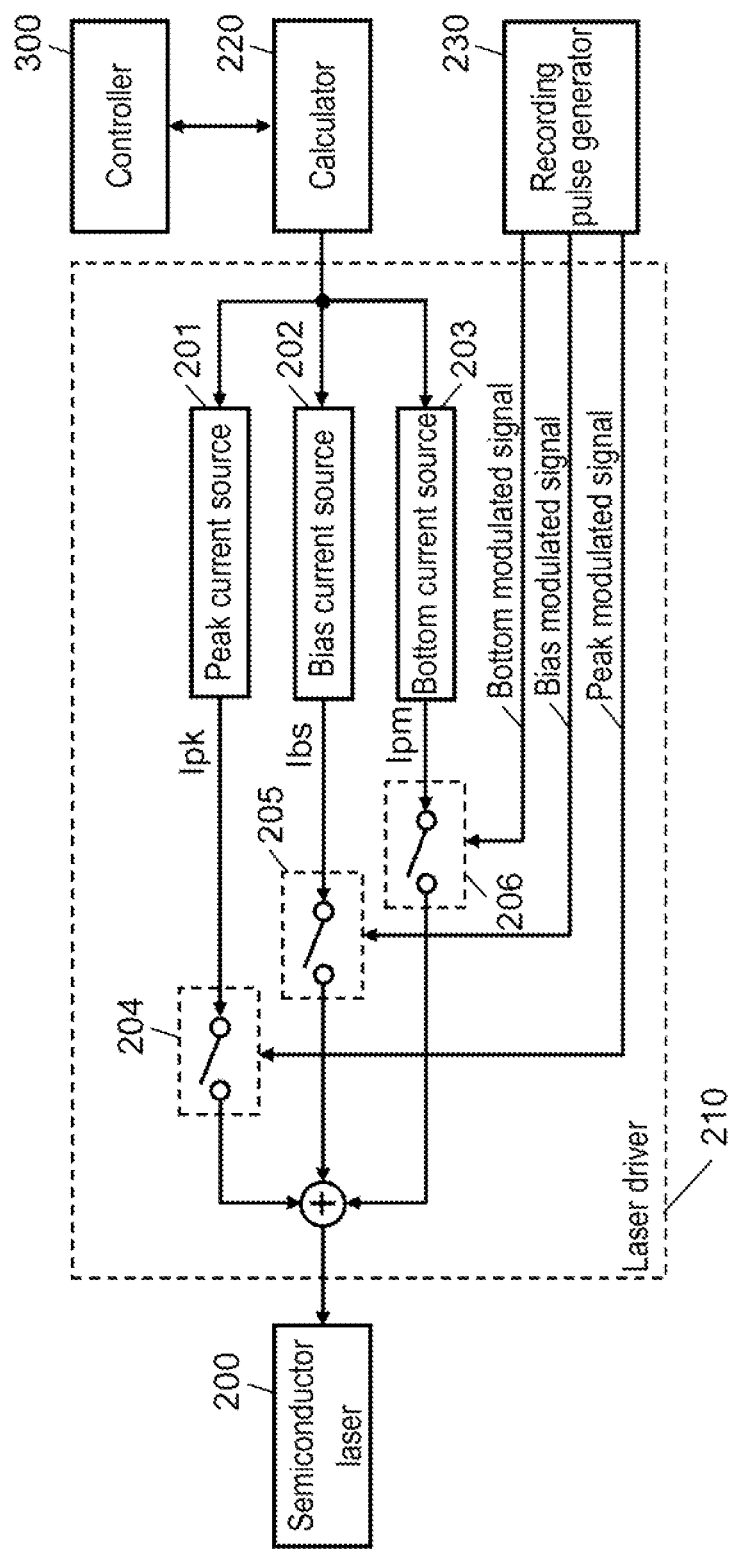
FIG. 5 is a block diagram of a laser power control apparatus according to the first exemplary embodiment of the present invention.

FIG. 5 is a block diagram of a laser power control apparatus according to the first exemplary embodiment of the present invention. The substantially same component as that in the block diagram of the conventional example described above is designated by the same numeral.

During the test recording, controller 300 controls calculator 220 to set the bottom driving current Ibm to the first bottom driving current value Ibm1 that is not lower than the threshold Ith. During the user data recording, controller 300 controls calculator 220 to set the bottom driving current Ibm to the second bottom driving current value Ibm2 that is lower than the threshold Ith.

In the block diagram of FIG. 5, the laser power control apparatus includes three current sources such as, peak current source 201, bias current source 202, bottom current source 203, and three modulators 204, 205, and 206 corresponding to the current sources. This is because the laser power control apparatus of FIG. 5 is aimed at the rewritable optical disk, and the emission is performed at the bias power in order to form the recording space. Because the present invention can also be applied to the write-once optical disk, in this case, the effect of the present invention can be obtained even if bias current source 202, modulator 205, and the bias modulated signal are eliminated in the block diagram of FIG. 5.

An operation of the laser power control apparatus of FIG. 5 will be described with reference to FIG. 6.

Figure 6:
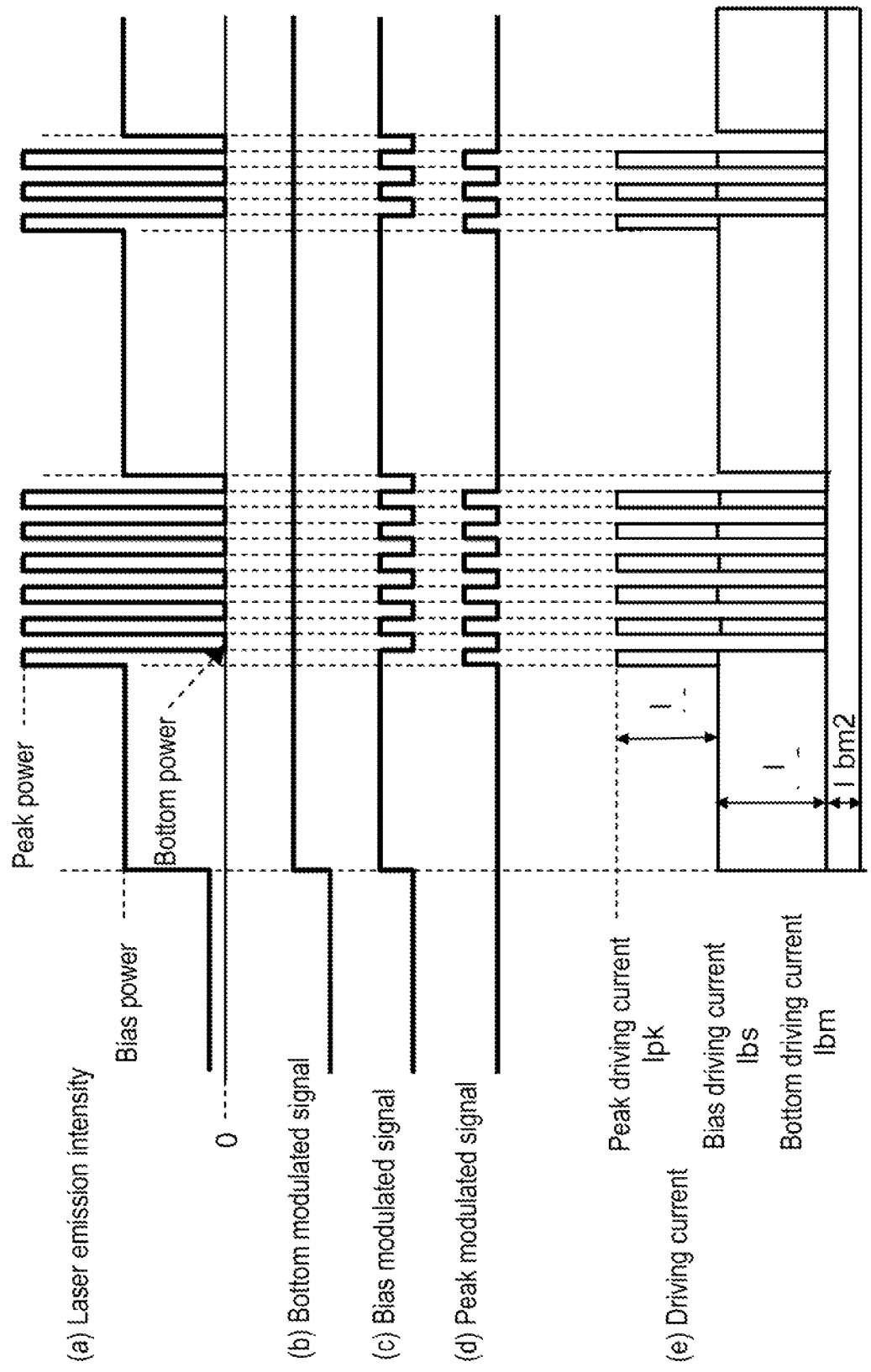
FIG. 6 is a diagram illustrating a relationship between the driving current and the laser power during user data recording in the first exemplary embodiment of the present invention.

FIG. 6 illustrates a relationship between the driving current and the laser power during the user data recording in the first exemplary embodiment of the present invention.

FIG. 6(a) illustrates the optical waveform of the laser during the user data recording. During the user data recording, the bottom driving current Ibm is set to the second bottom driving current value Ibm2 that is lower than the threshold Ith. Therefore, the bottom power is set to around 0 mW in the optical waveform of FIG. 6(a).

As illustrated in FIGS. 6(b), 6(c), and 6(d), according to the recording signal, the bottom modulated signal, the bias modulated signal, and the peak modulated signal are modulated to switch the driving current to the laser.

As illustrated in FIG. 6(e), the bottom driving current Ibm supplied by bottom current source 203 is set to the second bottom driving current value Ibm2 that is smaller than the current value of the conventional bottom driving current Ibm of FIG. 19. The current value of the bias driving current Ibs supplied by bias current source 202 is increased as large as the bias driving current value Ibs2. The peak driving current Ipk supplied by peak current source 201 is almost kept constant. The second bottom driving current Ibm2 is passed as the base, and the driving current Ibs2+Ipk2 in which the bias driving current Ibs2 and the peak driving current Ipk2, which are larger than those during the test recording, are added is modulated. Therefore, the rise time Tr and the fall time Tf of the optical waveform are improved during the multi-pulse emission.

A method for controlling the laser power will be described in detail with reference to FIG. 7.

Figure 7:
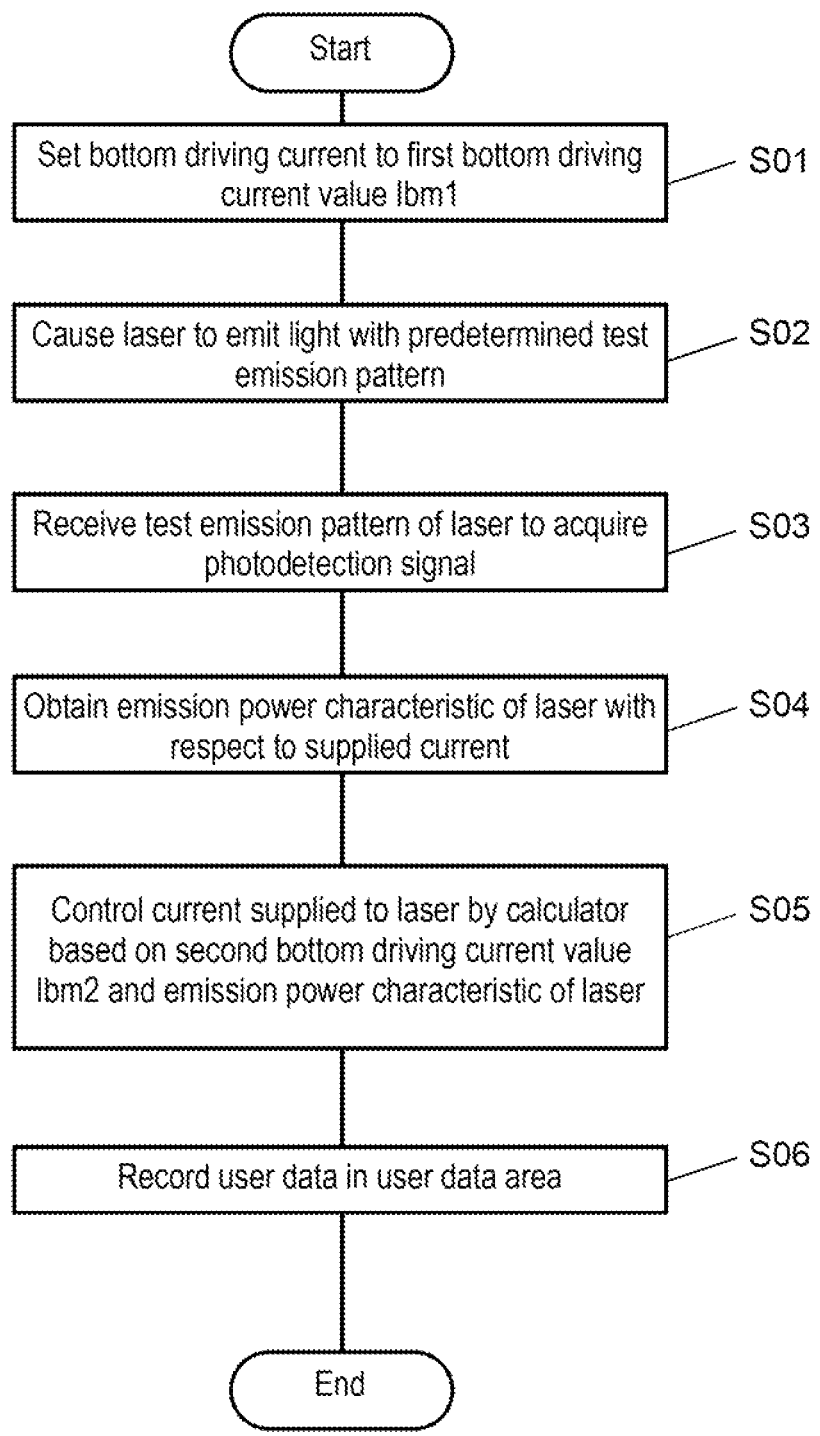
FIG. 7 is a flowchart illustrating laser power control in the first exemplary embodiment of the present invention.

FIG. 7 is a flowchart illustrating laser power control in the first exemplary embodiment of the present invention. Note that in each step of the following flowchart, there is no limitation to a time-series sequence. Elimination, concurrency, or repetition of some steps may be performed.

Controller 300 controls calculator 220 to set the bottom driving current Ibm to the first bottom driving current value Ibm1 that is not lower than the threshold Ith (S01).

The test recording is performed in the laser control area. Recording pulse generator 230 outputs a test emission pattern. The test emission pattern includes a multi-pulse emission interval in which laser 200 performs the pulse emission between the peak power and the bottom power during the formation of the recording mark, a continuous emission interval of the bottom power, and a continuous emission interval of the bias power in which laser emits the light during the formation of the recording space.

The test emission pattern is transmitted from recording pulse generator 230 to laser driver 210 using the bottom modulated signal, the bias modulated signal, and the peak modulated signal, and laser 200 emits the light according to the test emission pattern (S02).

In the write-once optical disk, the continuous emission interval of the bias power in which laser emits the light during the formation of the recording space may be eliminated in the test emission pattern.

A laser power detector (not illustrated) such as a photodetector receives the test emission pattern of laser 200 and converts the test emission pattern into an electric signal to acquire a photodetection signal (S03).

Calculator 220 calculates a value of the control signal corresponding to the peak power of the laser power in the multi-pulse emission based on an average value or a peak value or the like of the photodetection signal in the multi-pulse emission interval. The values of the control signals corresponding to the bottom power and the bias power of the laser power are calculated from the photodetection signals in the continuous emission intervals of the bottom power and the bias power. The laser power characteristic to the driving current is obtained from the calculated values. Slope efficiency can be calculated as the laser power characteristic (S04).

Controller 300 controls calculator 220 to set the bottom driving current Ibm to the second bottom driving current value Ibm2 that is lower than the threshold Ith. Based on the laser power characteristic for the driving current, calculator 220 calculates and outputs the control signal to control the current supplied to laser 200 (S05).

In the user data area, using the peak driving current Ipk2, the bias driving current Ibs2, and the second bottom driving current Ibm2, which are set by calculator 220, the multi-pulse emission is performed by the peak power, the bias power, and the bottom power, in which a fluctuation in laser power is suppressed, thereby recording the user data (S06).

Through the above steps, even if the laser power fluctuates due to a temperature change, an environmental change of the optical disk apparatus and the like, the calibration can be performed with high accuracy in the laser control area that is provided in each predetermined period on the optical disk. During user data recording, the bottom driving current is set to the second bottom driving current value Ibm that is smaller than the threshold Ith, so that the rise time Tr and the fall time Tf of the optical waveform can be improved to a high-speed level in the multi-pulse emission. Therefore, the high-speed recording of the optical disk can be performed.

A method for setting the second bottom driving current value Ibm2 during the user data recording will be described below with reference to FIG. 8.

Figure 8:
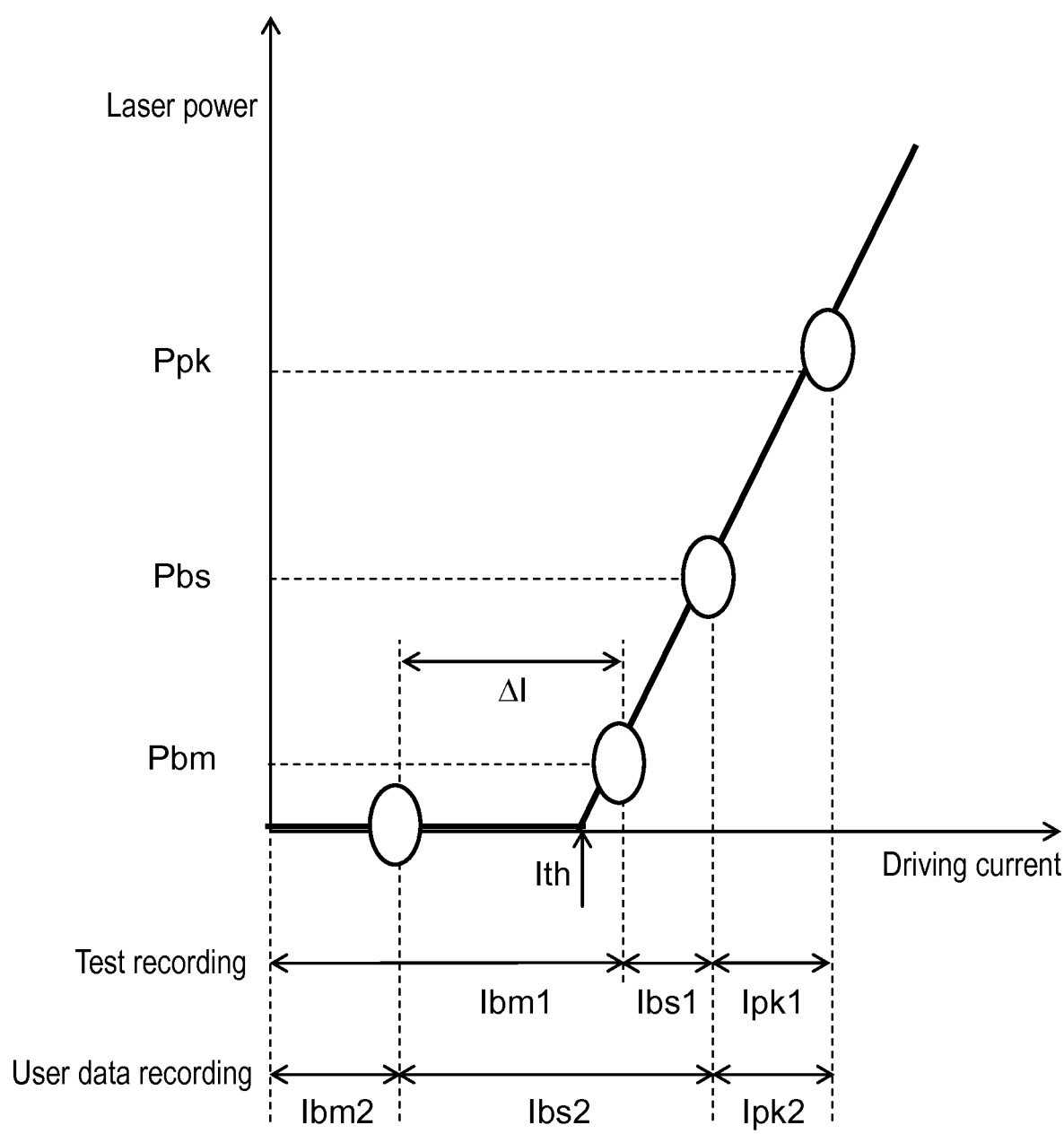
FIG. 8 is a diagram illustrating a comparison of the test recording and the user data recording with respect to the relationship between the laser power and the driving current in the first exemplary embodiment of the present invention.

FIG. 8 is a diagram illustrating a comparison of the test recording and the user data recording with respect to the relationship between the laser power and the driving current in the first exemplary embodiment of the present invention.

Referring to FIG. 8, during the test recording, the bottom driving current Ibm is set to the first bottom driving current value Ibm1 that is not lower than the threshold Ith. During the user data recording, the bottom driving current Ibm is set to the second bottom driving current value Ibm2 that is lower than the threshold Ith.

The second bottom driving current value Ibm2 can be set by subtracting a predetermined value $\Delta I$ from the first bottom driving current value Ibm1. As the predetermined value $\Delta I$ is increased while the second bottom driving current value Ibm2 is decreased, the rise time Tr and the fall time Tf of the optical waveform are shortened in the multi-pulse emission.

On the other hand, possibly the second bottom driving current value Ibm2 becomes 0 mA when the predetermined value $\Delta I$ is excessively increased, or the second bottom driving current value Ibm2 becomes negative when the predetermined value $\Delta I$ is automatically subtracted.

When laser is driven by the second bottom driving current value Ibm2, because the second bottom driving current value Ibm2 is smaller than the threshold Ith while the laser does not exist in the laser emission area, the bottom power becomes approximately 0 mW. Accordingly, it is difficult to control the relationship between the bottom driving current Ibm controlled by the control signal and the bottom power Pbm.

Because the threshold Ith fluctuates largely due to the temperature change and the like, disadvantageously the rise time Tr and the fall time Tf are changed when the second bottom driving current value Ibm2 is set to a fixed value.

Therefore, it is necessary that the second bottom driving current value Ibm2 be set to at least 0 mA or more even if the threshold Ith fluctuates. As illustrated in FIG. 8, the first bottom driving current value Ibm1 is measured during the test recording. Calculator 220 acquires the laser power characteristic to the driving current. Therefore, the threshold Ith can be acquired by the calculation. When the subtracted predetermined value $\Delta I$ is set to k·ith, the predetermined value $\Delta I$ can automatically be adjusted according to the fluctuation of the threshold Ith caused by the temperature change and the like. At this point, any positive number, such as 0.7 and 0.8, which is smaller than 1 can appropriately be selected as the constant k. That is, setting second bottom driving current value Ibm2=first bottom driving current value Ibm1−$\Delta I$=Ibm1−k·ith, the proper value, which is as small as possible and 0 mA or more, can be selected as the second bottom driving current value Ibm2. Therefore, even if the threshold Ith is fluctuated due to the temperature change and the like, the rise time Tr and the fall time Tf of the optical waveform can stably be shortened in the multi-pulse emission.

Instead of subtracting the predetermined value $\Delta I$ from the first bottom driving current value Ibm1 to obtain the second bottom driving current value Ibm2, the second bottom driving current value Ibm2 may be set based on the laser power characteristic to the driving current or the first bottom driving current value Ibm1. For example, the first bottom driving current value Ibm1 can be multiplied by a constant m to set the second bottom driving current value Ibm2. Any positive number, such as 0.2 and 0.3, which is smaller than 1 can be selected as the constant m.

The predetermined value $\Delta I$ is set to a fixed value after the predetermined value $\Delta I$ is calculated only once during start-up or a change in power target, which allows the rise time Tr and the fall time Tf of the optical waveform to be stably shortened in the multi-pulse emission.

Second Exemplary Embodiment

A second exemplary embodiment of the present invention will be described below with a focus on a method for more accurately controlling the optically-modulated waveform.

Figure 9:
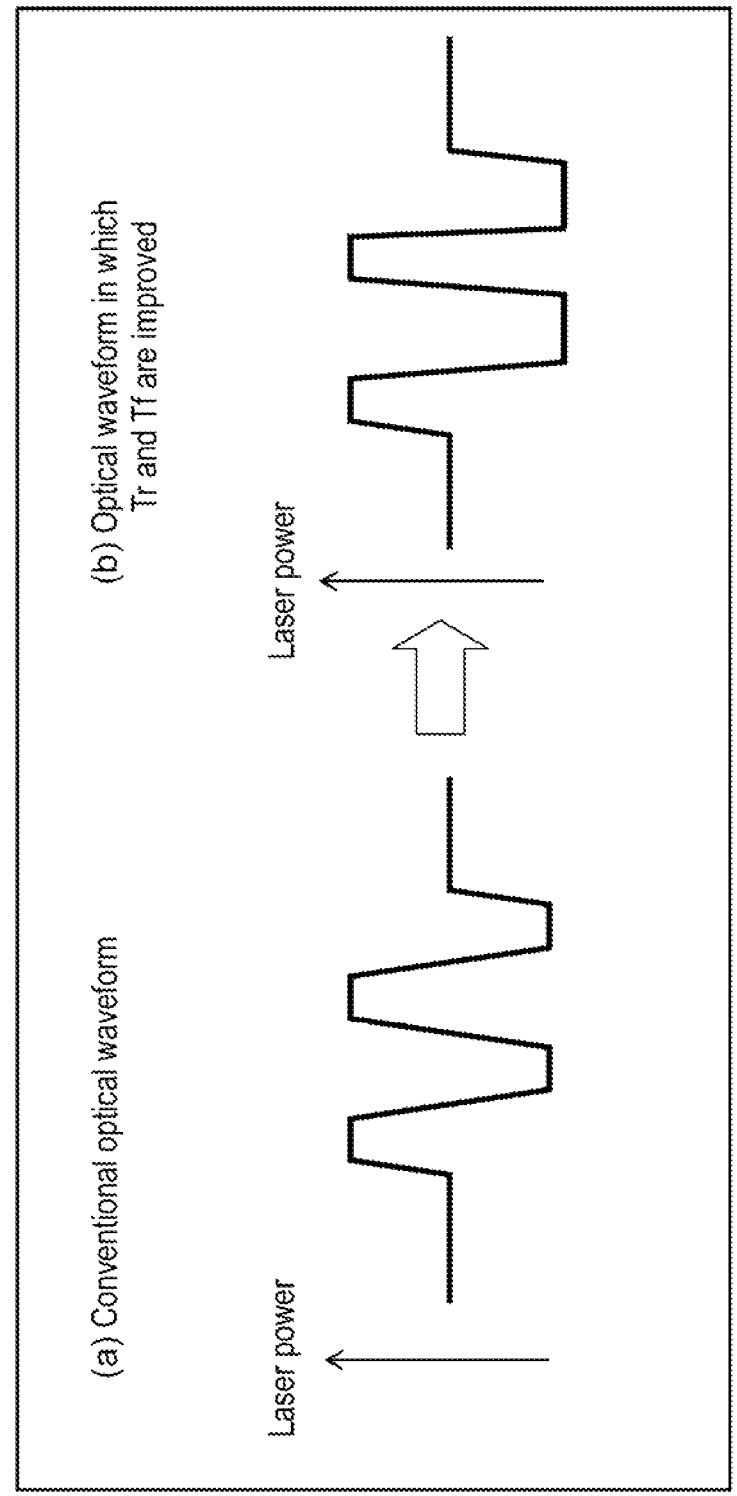
FIG. 9 is a diagram illustrating an optical waveform and a duty of the laser.

FIG. 9 illustrates the optical waveform and a duty of the laser. FIG. 9(a) illustrates the optically-modulated waveform during the conventional multi-pulse recording. The duty of the recording signal is assumed to be about 50%, and the rise time Tr and the fall time Tf are not shortened.

FIG. 9(b) illustrates the optically-modulated waveform in which the rise time Tr and the fall time Tf are improved to operate at high speed by the first exemplary embodiment of the present invention. In FIG. 9(b), because the bottom driving current is set to the second bottom driving current value Ibm2 that is lower than the threshold Ith, the bottom power becomes approximately 0 mW, and the width of the bottom power is larger than the width of the peak power in the optically-modulated waveform. In other words, the duty of the optically-modulated waveform is smaller than the duty of 50% of the recording signal.

The duty improving method will be described with reference to FIGS. 10 and 11.

Figure 10:
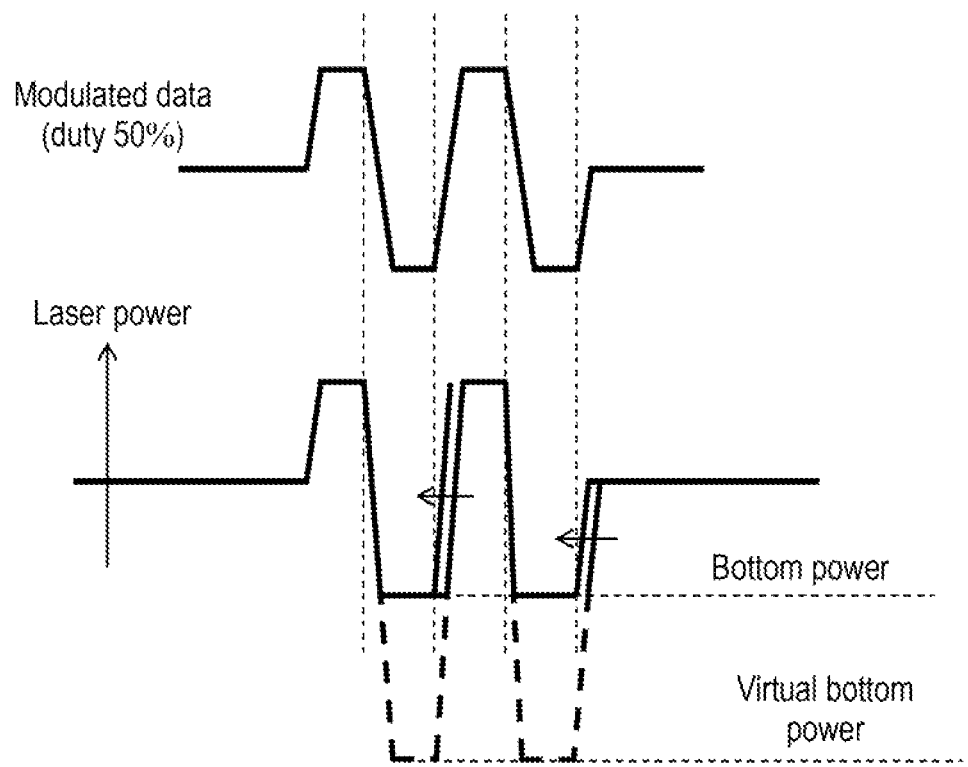
FIG. 10 is a diagram illustrating a timing correction of a recording signal in a second exemplary embodiment of the present invention.

FIG. 10 is a diagram illustrating a timing correction of the recording signal in the second exemplary embodiment of the present invention. FIG. 11 is a diagram illustrating another timing correction of the recording signal in the second exemplary embodiment of the present invention.

Referring to FIG. 10, when the modulated data of the recording signal is set to, the duty of 50%, a rising point from the bottom power to the peak power of the optical waveform is shifted forward. Therefore, the bottom driving current is set to the second bottom driving current value Ibm2 that is lower than the threshold Ith, the rise time Tr and the fall time Tf of the optically-modulated waveform are improved to the high-speed level, and the duty of the optically-modulated waveform can be set to 50%.

Specifically, in recording pulse generator 230 of the laser power control apparatus of FIG. 5, the rising point of the recording signal can be corrected to be shifted forward. Therefore, the rising points of the bias modulated signal and the peak modulated signal, which control the modulation during the recording, are shifted forward.

Figure 11:
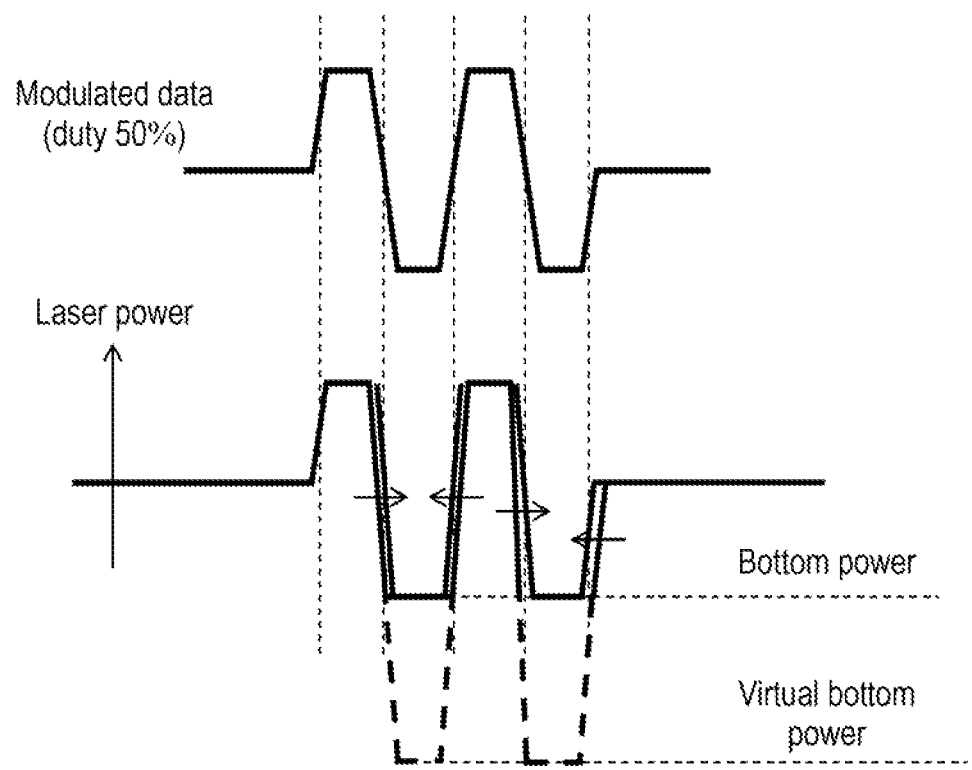
FIG. 11 is a diagram illustrating another timing correction of the recording signal in the second exemplary embodiment of the present invention.

Referring to FIG. 11, when the modulated data of the recording signal is set to the duty of 50%, the interval in which the light is emitted at the peak power of the optical waveform is extended backward and forward. The falling point from the peak power to the bottom power is shifted backward while the rising point from the bottom power to the peak power is shifted forward. In recording pulse generator 230 of the laser power control apparatus of FIG. 5, the falling point from the peak power to the bottom power can be shifted backward while the rising point from the bottom power to the peak power can be shifted forward. Therefore, the bottom driving current is set to the second bottom driving current value Ibm2 that is lower than the threshold Ith, the rise time Tr and the fall time Tf of the optically-modulated waveform are improved to the high-speed level, and the duty of the optically-modulated waveform can be set to 50% in consideration of a power center of a pulse change point.

Next, improvement of overshoot of the optically-modulated waveform will be described. Although the rise time Tr and the fall time Tf of the optically-modulated waveform can be improved to a high-speed level by the present invention, sometimes the rise of the optically-modulated waveform is overshot.

Figure 12:
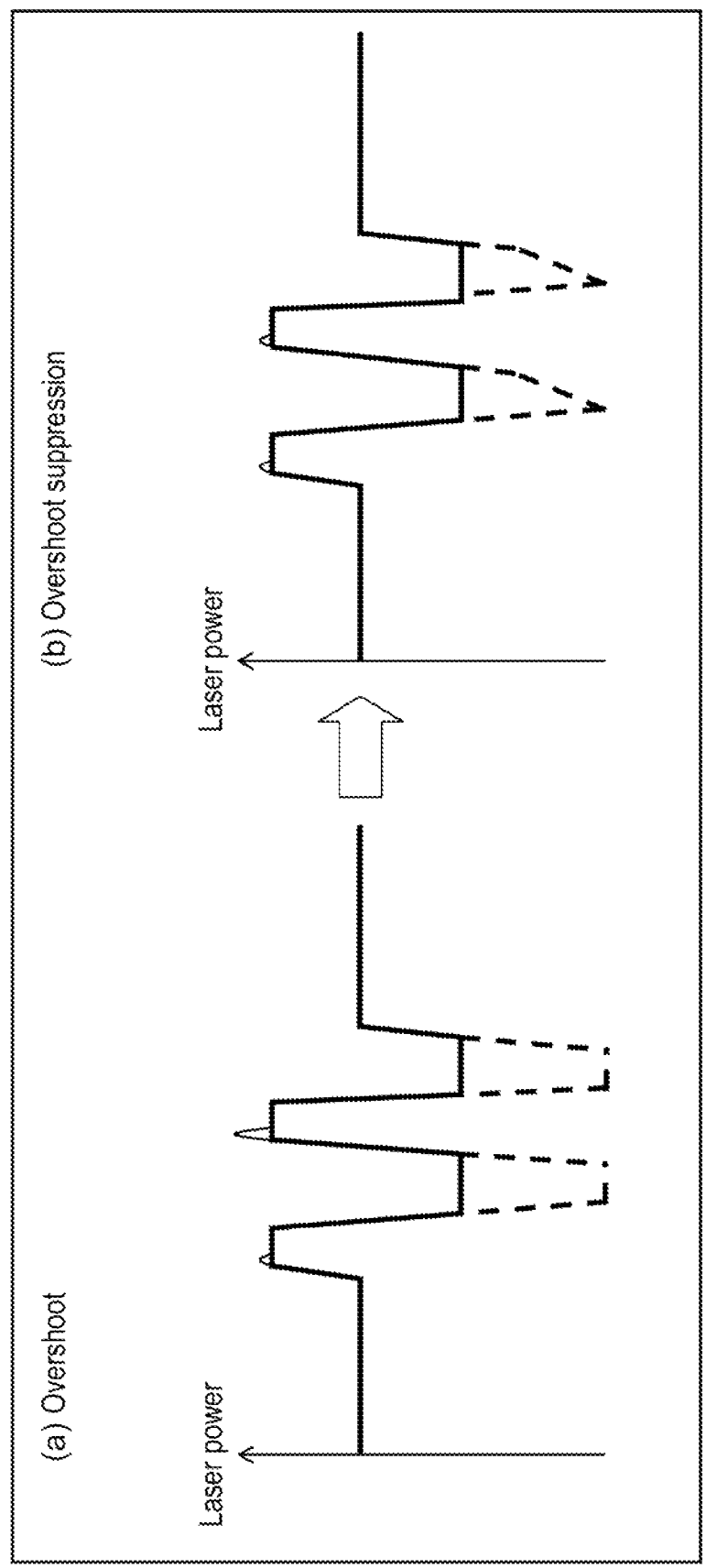
FIG. 12 is a diagram illustrating overshoot suppression of an optical pulse in the second exemplary embodiment of the present invention.

FIG. 12 illustrates overshoot suppression of the optical pulse in the second exemplary embodiment of the present invention. FIG. 12(a) illustrates the optically-modulated waveform in which the rise time Tr and the fall time Tf are improved to the high-speed level by setting the bottom driving current to the second bottom driving current value Ibm2 that is lower than the threshold Ith. However, the overshoot is generated in the rise from the bias power to the peak power.

FIG. 12(b) illustrates the optically-modulated waveform in which the overshoot is suppressed at the rising point of the peak power. Specifically, a predetermined first current value is added to the second bottom driving current Ibm2 until the rising point from the bottom power to the peak power since the falling point from the peak power to the bottom power. The added predetermined first current may appropriately be selected according to the semiconductor laser, a laser driving circuit, a floating capacitance of a wiring material or the like, and inductance. The interval in which the predetermined first current is added, amplitude, and constant DC or modulation may appropriately be selected. In FIG. 12(b), a current having a triangular wave value is added as an example of the predetermined first current. The stepwise triangular wave or a pulse string of a plurality of triangular waves can be selected. At the rising point of the peak power, the current value of the bottom driving current is set slightly larger than the second bottom driving current value Ibm2 to suppress the overshoot.

As to another method for suppressing the overshoot, a predetermined second current value may be subtracted from the bias driving current at the rising point from the bias power to the peak power.

Figure 13:
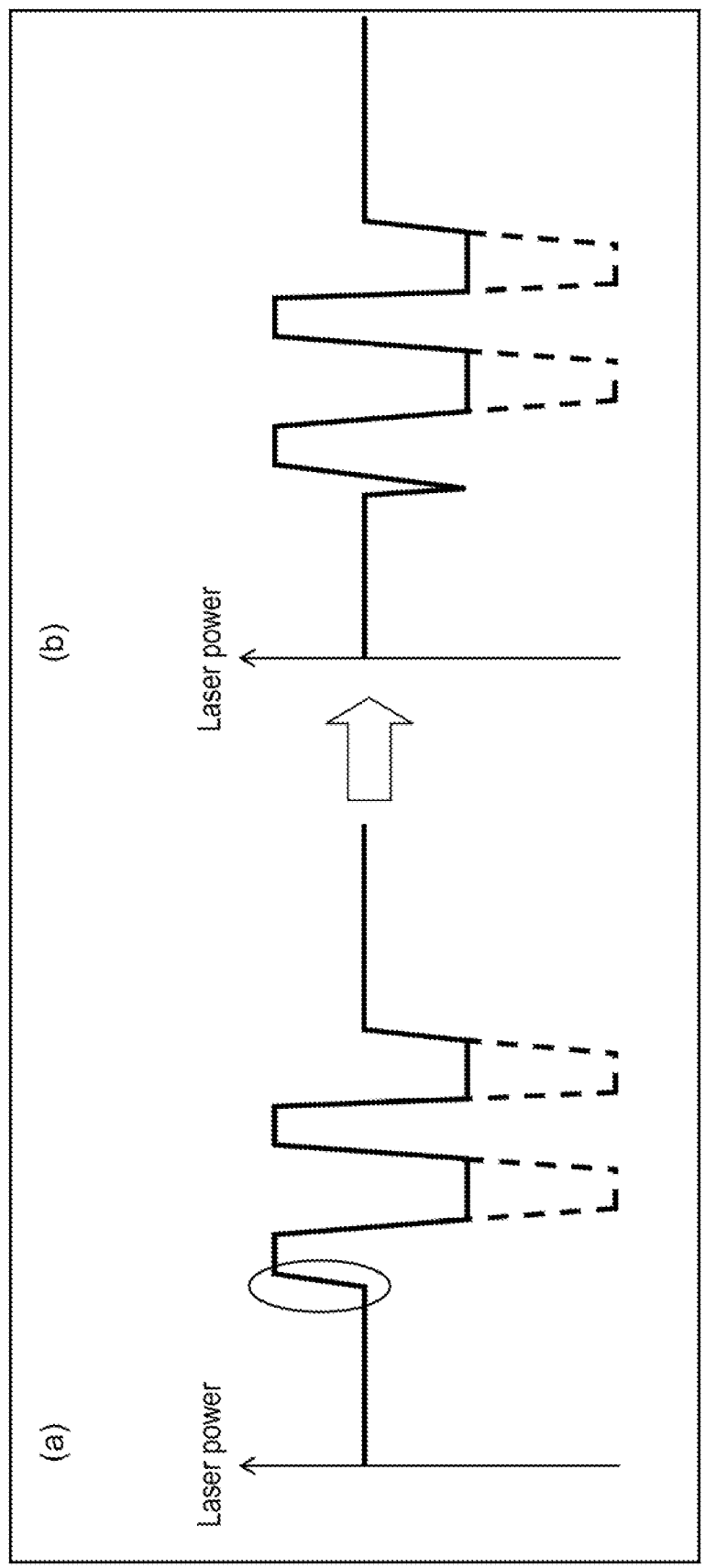
FIG. 13 is a diagram illustrating rise of an initial pulse of the optical pulse in the second exemplary embodiment of the present invention.

FIG. 13 is a diagram illustrating rise of an initial pulse of the optical pulse in the second exemplary embodiment of the present invention. A circular portion of FIG. 13(a) indicates a position where the laser power rises from the bias power to the peak power. As illustrated in FIG. 13(b), the predetermined second current value is subtracted from the bias driving current before the laser power rises from the bias power to the peak power, which allows the rise of the optical pulse to be improved. The predetermined second current value may appropriately be selected according to the semiconductor laser, the laser driving circuit, the floating capacitance of the wiring material or the like, and the inductance. The interval in which the predetermined second current value is added, the amplitude, and the constant DC or modulation may appropriately be selected.

Figure 14:
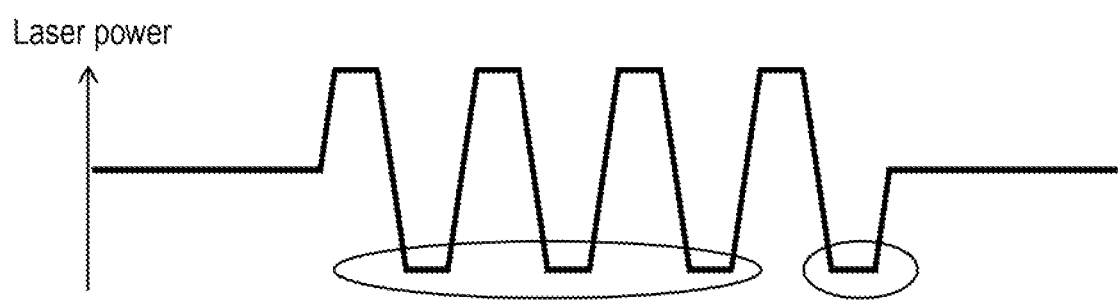
FIG. 14 is a diagram illustrating selection of the optical pulse in the second exemplary embodiment of the present invention.

The second bottom driving current value Ibm2 that is less than the threshold Ith may selectively be applied to the pulse string of the multi-pulse emission. FIG. 14 is a diagram illustrating the selection of the optical pulse in the second exemplary embodiment of the present invention. As illustrated in FIG. 14, the pulse string of the multi-pulse emission is divided into two groups, namely, a first-half pulse string and a final pulse string, and the second bottom driving current value Ibm2 that is less than the threshold Ith may selectively be applied. The number of groups, the kind of group, the number of pulses in the group can be selected according to the characteristic of the recording medium in order to optimize a temperature control characteristic of the recording of the recording medium.

Figure 15:
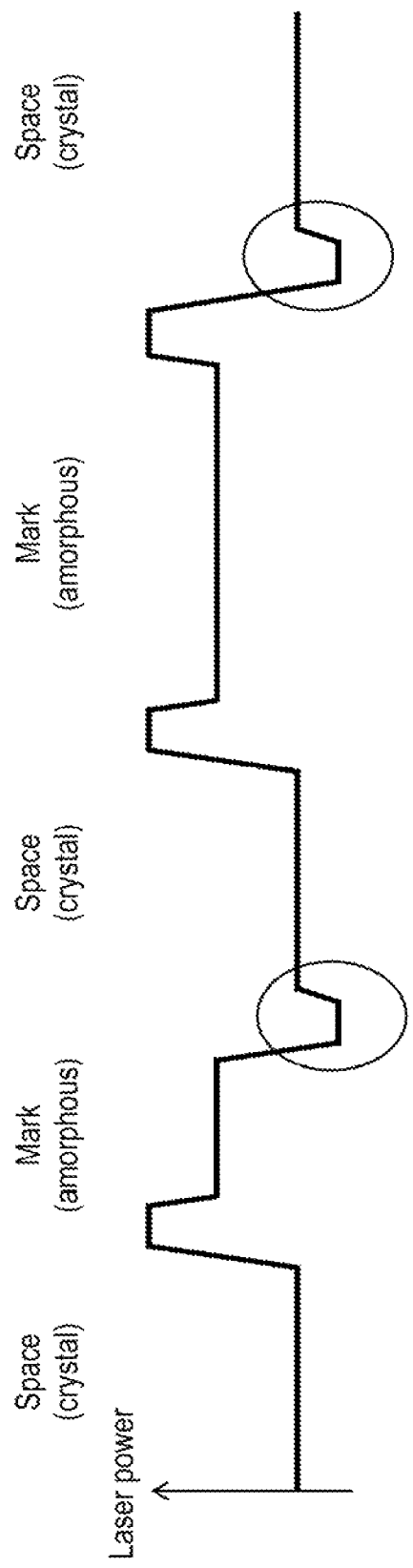
FIG. 15 is a diagram illustrating non-multi-pulse emission in the second exemplary embodiment of the present invention.
Figure 17:
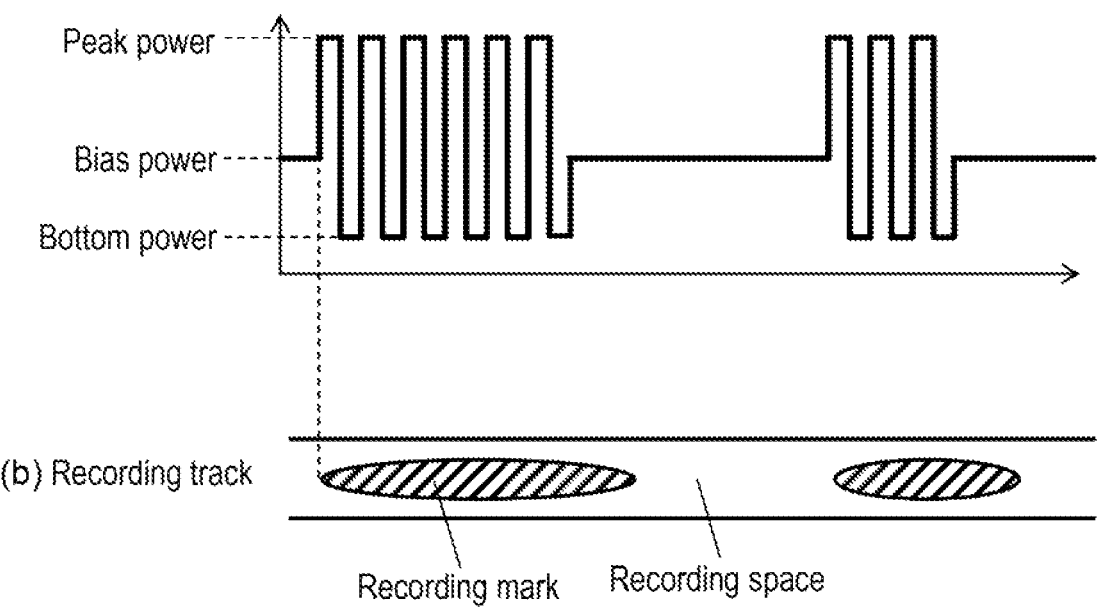
FIG. 17 is a diagram illustrating the relationship between the laser power and the recording mark with respect to a rewritable optical disk.
Figure 18:
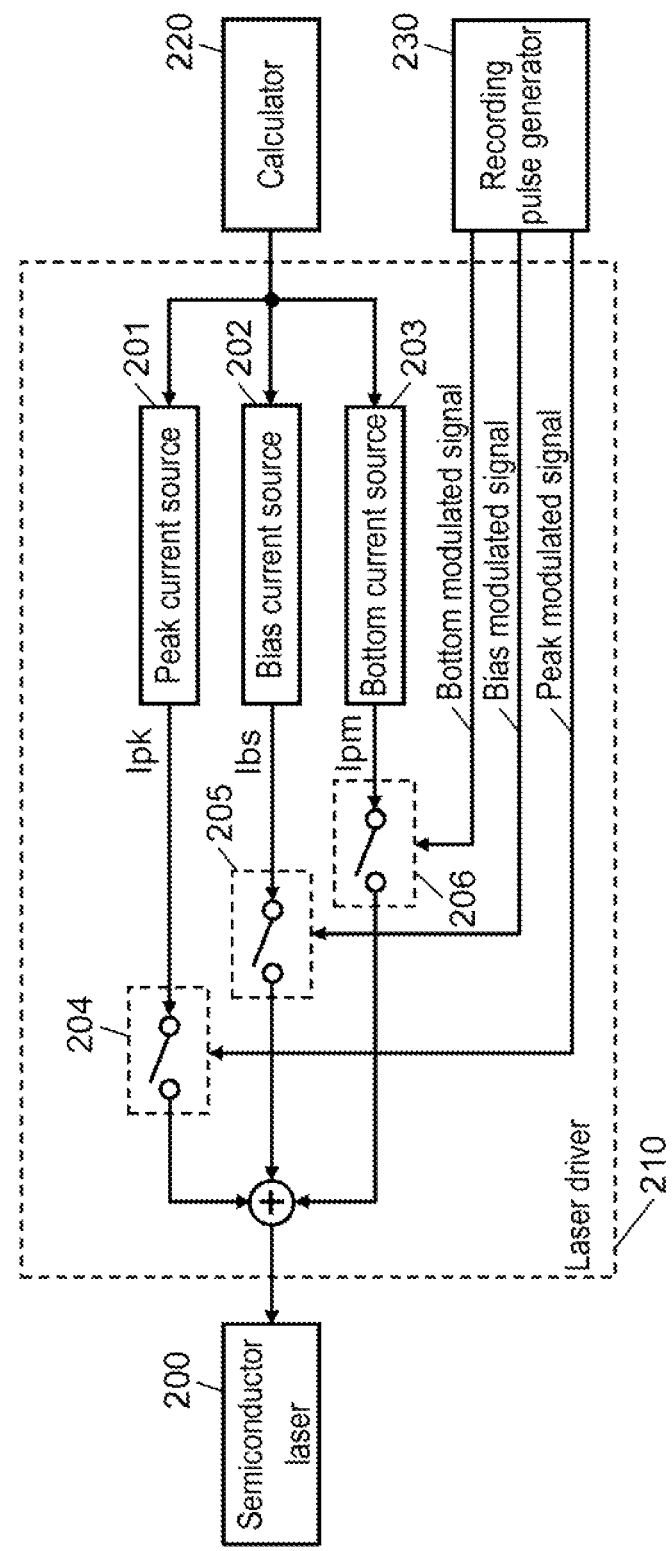
FIG. 18 is a block diagram of a conventional laser power control apparatus.

The first and second exemplary embodiments are described based on the multi-pulse emission. FIG. 15 is a diagram illustrating non-multi-pulse emission in the second exemplary embodiment of the present invention.

Even in the non-multi-pulse emission illustrated in FIG. 15, in a circular portion, the bottom driving current is set to the second bottom driving current value Ibm2 that is lower than the threshold Ith, which allows the rise time Tr and the fall time Tf of the optical waveform to be improved to the high-speed level in an end edge portion of the recording mark.

During the user data recording, sometimes the peak power Ppk and the bias power Pbs are equal to those set during the test recording. Alternatively, the peak power Ppk and the bias power Pbs may appropriately be set to a value different from those set during the test recording according to the recording condition of the optical disk, the environmental condition, and conditions such as a change with time of the laser.

In the description of the first and second exemplary embodiments, the bottom power, the bias power, and the peak power are used as the laser power relating to the recording by way of example. Even if the bottom power and the peak power are used while the bias power is eliminated, the recording can be performed to a recording type optical disk. For example, in the write-once optical disk, only the recording mark may be recorded, and the effect of the present invention can be obtained even if the setting of the bias power is eliminated.

In the write-once optical disk, when the recording power of the recording medium has a wide margin, the laser power calibration performed by the test recording described in the first and second exemplary embodiments can be eliminated or the number of calibrations can be decreased. In this case, during the user data recording, the recording is performed by setting the bottom driving current to the second bottom driving current value Ibm2 that is lower than the threshold Ith.

The constituents of the first and second exemplary embodiments are described based on the hardware. Alternatively, the constituents may be constructed by software. The control step of the hardware may be performed by the control step of the software. The constituents and the control steps of the software are incorporated as a program in one or a plurality of LSIs, and the exemplary embodiments may be implemented by the one or a plurality of LSIs.

Calculator 220 and controller 300 are integrally formed, and calculator 220 and controller 300 can be designed as the hardware or software and implemented.

In carrying out the present invention, during the test recording, the step of setting the bottom driving current corresponding to the bottom power to the first bottom driving current value Ibm1 that is not lower than the threshold current may be eliminated when the bottom driving current to which the test recording is already performed can be used. In this case, during the user data recording, the bottom driving current may be set to the second bottom driving current value Ibm2 that is less than the threshold.

The present invention can be applied to not only the optical disk apparatus but also a laser printer or a laser machining apparatus as long as an object is changed by heat of the laser.

Industrial Applicability

In the laser power control apparatus of the present invention, the rise time and the fall time of the optical pulse width forming the recording mark can be shortened even if the frequency of the recording signal is increased to narrow the optical pulse width and high-speed recording can be performed. Therefore, the present invention can be applied to the fields such as the auxiliary storage device in which the large-capacity, high-speed recording type optical disk is used and the consumer video recorder. Additionally, the present invention can be applied to not only the optical disk apparatus but also the laser printer and the laser machining apparatus.

REFERENCE MARKS IN THE DRAWINGS

200 Semiconductor laser
201 Peak current source
202 Bias current source
203 Bottom current source
204 Modulator
205 Modulator
206 Modulator
210 Laser driver
220 Calculator
230 Recording pulse generator
300 Controller

The invention claimed is:

1. A laser power control method in which a laser power is modulated between a bottom power and a peak power to record a signal on an optical disk, the method comprising the steps of:
during test recording, setting a bottom driving current corresponding to the bottom power to a first bottom driving current value, the first bottom driving current value being not lower than a threshold current value of a laser emission area having a linear relationship between a driving current and a laser power; and
during user data recording, setting the bottom driving current corresponding to the bottom power from the first bottom driving current value to a second bottom driving current value, the second bottom driving current value being not greater than the threshold current value, and modulating the laser power between the bottom power and the peak power.

2. The laser power control method according to claim 1, wherein the bottom power corresponding to the first bottom driving current value is set to a value more than 0 mW.

3. The laser power control method according to claim 1, comprising the step of further setting a bias power corresponding to a space between the bottom power and the peak power.

4. The laser power control method according to claim 1, comprising the step of performing multi-pulse emission of the laser power between the bottom power and the peak power during the signal recording.

5. The laser power control method according to claim 1, wherein a value of the second bottom driving current is calculated based on a power corresponding to a driving current, the power being detected during the test recording.

6. The laser power control method according to claim 1, wherein a rising point from the bottom power to the peak power is shifted forward during the user data recording.

7. The laser power control method according to claim 1, wherein an interval in which the emission is performed at the peak power is extended backward and forward during the user data recording.

8. The laser power control method according to claim 1, wherein, during the user data recording, a predetermined first current value is added to the second bottom driving current value until the rising point from the bottom power to the peak power since a falling point from the peak power to the bottom power.

9. The laser power control method according to claim 3, wherein, during the user data recording, a predetermined second current value is subtracted from a bias driving current value corresponding to the bias power before a rising point from the bias power to the peak power.

10. The laser power control method according to claim 4, wherein, during the user data recording, a predetermined pulse string is selected from pulse strings in which the multi-pulse emission is performed, and a bottom driving current corresponding to the selected pulse string is set to the second bottom driving current value.

11. A laser power control apparatus that controls a laser power used to record a signal on an optical disk, comprising:
a calculator that sets the laser power to a bottom power and a peak power by controlling a driving current used to drive a laser;
a modulator that performs pulse emission of the laser power between the bottom power and the peak power by a recording signal; and
a controller that (i) during test recording, sets a bottom driving current corresponding to the bottom power to a first bottom driving current value, the first bottom driving current value being not lower than a threshold current value of a laser emission area having a linear relationship between a driving current and a laser power and (ii) during user data recording, sets the bottom driving current corresponding to the bottom power to a second bottom driving current value, the second bottom driving current value being not greater than the threshold current value, and modulates the laser power between the bottom power and the peak power.

12. The laser power control apparatus according to claim 11, wherein
the calculator further sets a bias power corresponding to a space between the bottom power and the peak power, and
the modulator performs multi-pulse emission of the laser power between the bottom power and the peak power by the recording signal.

* * * * *